L. C. BAYLES.
FLOW CONTROLLING VALVE FOR CONDUITS.
APPLICATION FILED FEB. 5, 1914.

1,154,962.

Patented Sept. 28, 1915.

WITNESSES:

INVENTOR

Lewis C. Bayles

BY

ATTORNEY

UNITED STATES PATENT OFFICE.

LEWIS C. BAYLES, OF EASTON, PENNSYLVANIA, ASSIGNOR TO INGERSOLL-RAND COMPANY, OF JERSEY CITY, NEW JERSEY, A CORPORATION OF NEW JERSEY.

FLOW-CONTROLLING VALVE FOR CONDUITS.

1,154,962.

Specification of Letters Patent.

Patented Sept. 28, 1915.

Application filed February 5, 1914. Serial No. 816,815.

*To all whom it may concern:*

Be it known that I, LEWIS C. BAYLES, a citizen of the United States, residing at Easton, in the county of Northampton and State of Pennsylvania, have invented a certain new and useful Improvement in Flow-Controlling Valves for Conduits, of which the following is a specification.

This invention relates to valves for controlling the flow of air or other fluid through a pipe or other conduit so that more than a certain predetermined amount of fluid can not pass through the conduit in a certain period of time, and is particularly adapted to be used in pipe lines for supplying compressed air to individual drills or tools so that the operator can not use more than a certain amount of air in a definite period.

The object of this invention is to provide a simple and positively acting valve of this type.

A further object is to provide a valve of this type which will be reversible and therefore can not be wrongly applied in a pipe line.

With these objects in view, a valve has been devised, a practical embodiment of which is shown in the accompanying drawings in which—

Figure 1:
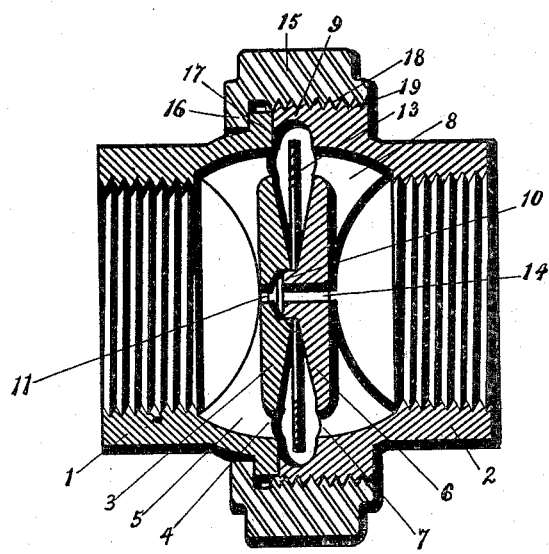
Figure 2:
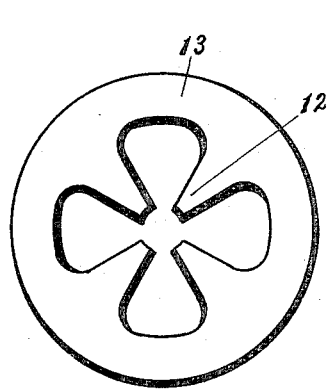
Figure 3:
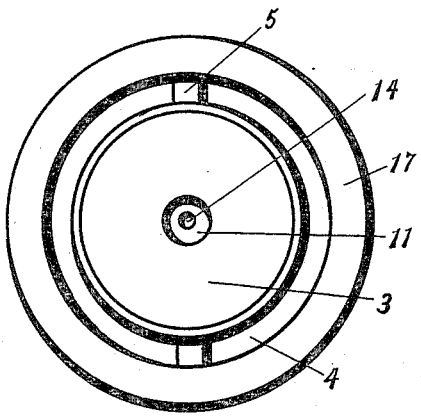

Figure 1 shows a longitudinal section through the valve, Fig. 2 shows an elevation of the valve plate and Fig. 3 shows an end elevation of one of the valve seats.

As shown, the complete valve comprises a pair of cylindrical casing sections 1 and 2 the outer ends of which are threaded for the reception of pipes. Across the inner end of section 1 is a slightly conical or outwardly beveled valve seat 3 through which is a nearly annular port 4, a diametrical rib 5 being provided to support the central disk shaped portion of the valve seat. The section 2 has a valve seat 6, port 7 and a rib 8 similar to those of section 1, but has a sleeve portion 9 extended to engage the face of the section 1 and form an annular chamber of larger diameter than ports 4 and 7, affording communication between these ports. The valve seat 6 has a circular boss 10 fitting into a corresponding depression 11 in the valve seat 3 this boss serving to support the internally projecting arms 12 of a spring plate valve 13 which is held between the two valve seats in a position to close either port 4 or port 7 but normally out of contact with both. This valve 13 will not close the port 4 or port 7 tightly enough to prevent some leakage and an additional passage for leakage may be provided in the shape of a leak port 14 from one side of the valve seats to the other, this being shown as passing through the center of the valve seats. The sections of the valve casing and the valve are secured together by a collar 15 which has a flange 16 engaging a flange 17 on section 1, and a threaded portion 18 engaging corresponding threads 19 on the outer circumference of section 2.

In operation, the valve 13 will remain in its central position as long as the flow of the fluid is normal. If, however, supposing the valve were used in the hose leading to a drill, the drill operator should disconnect his drill and use the air to blow out smoke or for other purposes he could not use more than a certain amount per minute, this amount being determined by the size of the ports and the size and strength of the spring plate valve. If the drill operator should allow more than this predetermined amount to pass through the hose the plate valve would be carried over by the current against one of the valve seats and cut off the flow entirely. In order to open the valve again the operator would have to close off the end of the hose. The air leaking around the valve or through the leak port 14 would then build up pressure on the back of the valve and allow it to return to normal position whereupon the drill operator could resume work.

The valve shown in the present construction is adapted to close the port in either valve seat equally well so that it will operate no matter in which direction the air passes through it. For this reason it is immaterial which way it is connected in the hose and it is impossible for an operator to connect it in wrongly.

It is to be understood that the present showing and description discloses only one specified embodiment of my invention and other forms and modifications are included in the spirit and scope of the invention as expressed in the claims.

What I claim is:

1. A reversible flow controlling valve for a conduit, comprising oppositely beveled valve seats having annular ports therein, positioned across said conduit, a spring plate valve positioned between said seats and adapted to close either port but arranged to be resiliently held out of contact with both during normal flow.

2. As an article of manufacture, a reversible flow controlling valve for a conduit comprising two adjacent sections adapted to be secured to connecting pipe ends, each of said sections having in its adjacent opening a slightly conical valve seat having an annular port through its outer edge, a projection at the center of one of said seats fitting a corresponding depression in the other and a plate valve having internal spring arms engaging said projection and held between said seats so that said valve is in contact with neither valve seat.

3. As an article of manufacture, a reversible flow controlling valve for a conduit comprising two adjacent sections adapted to be secured to connecting pipe ends, each of said sections having in its adjacent opening a slightly conical valve seat having an annular port through its outer edge, a projection at the center of one of said seats fitting a corresponding depression in the other, a plate valve having internal spring arms engaging said projection and held between said seats so that said valve is in contact with neither valve seat, a leak port through said seat from one side to the other and means for securing the sections together.

In testimony whereof, I have hereunto set my hand.

LEWIS C. BAYLES.

Witnesses:
 CLARENCE MAHN,
 C. S. MILEY.

Copies of this patent may be obtained for five cents each, by addressing the "Commissioner of Patents, Washington, D. C."